United States Patent
Chang et al.

(10) Patent No.: US 9,693,334 B2
(45) Date of Patent: Jun. 27, 2017

(54) COMMUNICATION CONTROL METHOD AND USER TERMINAL

(71) Applicant: KYOCERA CORPORATION, Kyoto (JP)

(72) Inventors: Henry Chang, San Diego, CA (US); Noriyoshi Fukuta, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/891,873

(22) PCT Filed: May 14, 2014

(86) PCT No.: PCT/JP2014/062825
§ 371 (c)(1),
(2) Date: Nov. 17, 2015

(87) PCT Pub. No.: WO2014/188928
PCT Pub. Date: Nov. 27, 2014

(65) Prior Publication Data
US 2016/0100378 A1    Apr. 7, 2016

Related U.S. Application Data

(60) Provisional application No. 61/825,262, filed on May 20, 2013.

(51) Int. Cl.
*H04W 64/00* (2009.01)
*H04W 48/16* (2009.01)
(Continued)

(52) U.S. Cl.
CPC ......... *H04W 64/003* (2013.01); *H04W 48/16* (2013.01); *H04W 24/02* (2013.01);
(Continued)

(58) Field of Classification Search
CPC .................................................. H04W 64/003
(Continued)

(56) References Cited

U.S. PATENT DOCUMENTS 9,008,687 B2 *   4/2015   Johansson ........... H04W 64/003
                                                          455/456.1
9,380,472 B2 *   6/2016   Jeong ..................... H04W 24/02
(Continued)

FOREIGN PATENT DOCUMENTS

EP       2 785 079 A1    10/2014
EP       2 860 883 A1     4/2015
(Continued)

OTHER PUBLICATIONS

3GPP TSG-RAN Meeting #57, RP-1201455, Chicago, USA, Sep. 13-15, 2012, Intel Corporation, New Study Item Proposal on WLAN/3GPP Radio Interworking.
(Continued)

*Primary Examiner* — Michael T Vu
(74) *Attorney, Agent, or Firm* — Studebaker & Brackett PC

(57) ABSTRACT

A communication control method according to a first aspect includes: a step A of acquiring, by a user terminal that supports a cellular communication and a WLAN communication, access point location information on a geographical location of a WLAN access point; a step B of transmitting, from the user terminal to a cellular network, the access point location information; and a step C of acquiring, by a cellular base station included in the cellular network, the access point location information.

17 Claims, 9 Drawing Sheets

(51) Int. Cl.
    *H04W 24/02* (2009.01)
    *H04W 84/04* (2009.01)
    *H04W 84/12* (2009.01)
    *H04W 88/06* (2009.01)

(52) U.S. Cl.
    CPC .......... *H04W 84/042* (2013.01); *H04W 84/12* (2013.01); *H04W 88/06* (2013.01)

(58) Field of Classification Search
    USPC .......................................... 455/456.1–456.6
    See application file for complete search history.

(56) References Cited

U.S. PATENT DOCUMENTS

| | | | |
|---|---|---|---|
| 2007/0002813 A1 | 1/2007 | Tenny et al. | |
| 2011/0264780 A1* | 10/2011 | Reunamaki | H04L 67/16 709/223 |
| 2013/0189970 A1 | 7/2013 | Fukuta | |
| 2014/0056169 A1 | 2/2014 | Jung et al. | |

FOREIGN PATENT DOCUMENTS

| | | |
|---|---|---|
| EP | 2 934 051 A1 | 10/2015 |
| JP | 2005-086451 A | 3/2005 |
| WO | 2012/046853 A1 | 4/2012 |
| WO | 2012/148203 A2 | 11/2012 |
| WO | 2014/166729 A1 | 10/2014 |

OTHER PUBLICATIONS

International Search Report issued in PCT/JP2014/062825, mailed Aug. 19, 2014.
Written Opinion issued in PCT/JP2014/062825, mailed Aug. 19, 2014.
The extended European search report issued by the European Patent Office on Jan. 5, 2017, which corresponds to European Patent Application No. 14800341.1-1505; 11pp.
Intel Corporation; "Report on RAN2 email discussion [81bis#11][Joint/WiFi] WLAN scanning and power comsumption (Intel)"; 3GPP TSG RAN2 Meeting #82; R2-132017; Fukuoka, Japan; May 20-24, 2013; 10pp.

* cited by examiner

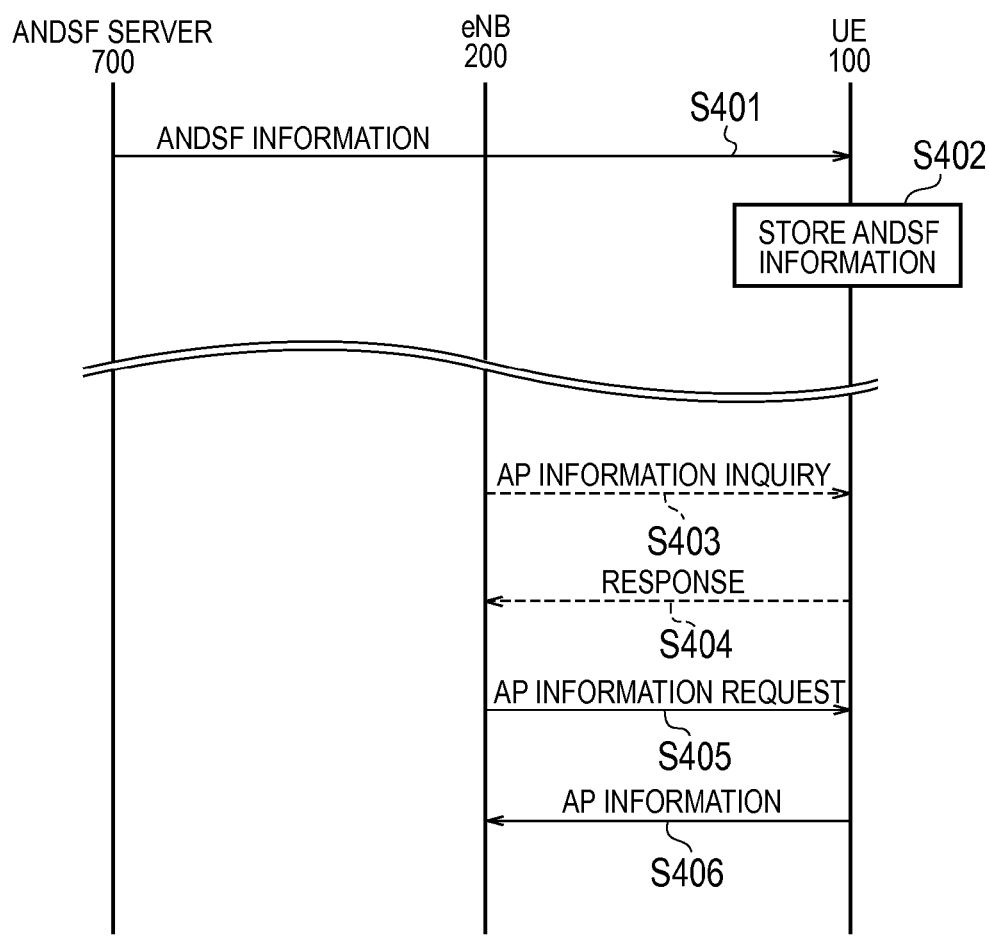

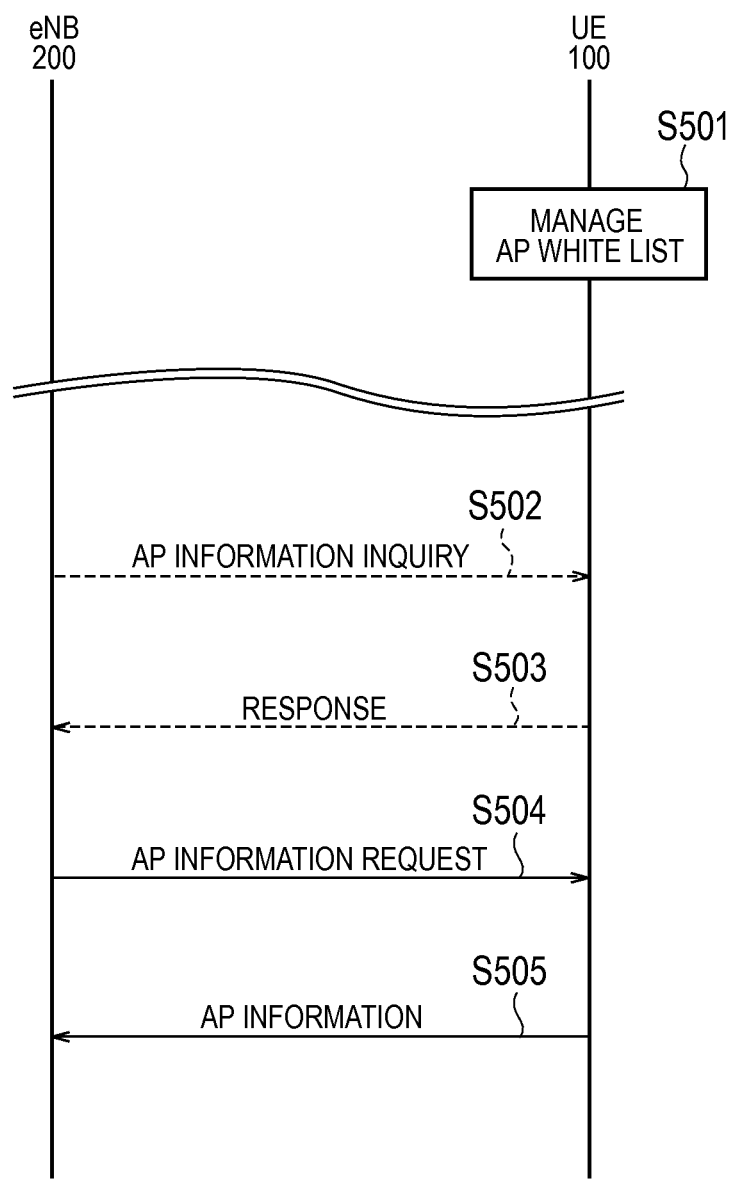

COMMUNICATION CONTROL METHOD AND USER TERMINAL

TECHNICAL FIELD

The present invention relates to a communication control method and a user terminal which are used in a cellular communication system capable of working together with a wireless LAN system (WLAN system).

BACKGROUND ART

In recent years, the popularization of user terminals (so-called dual terminal) that support communication schemes of both WLAN communications and cellular communications is in progress. Moreover, WLAN access points managed by operators of cellular communication systems are increasing.

3GPP (3$^{rd}$ Generation Partnership Project), which is a standardization project of cellular communication systems, is planning to consider techniques capable of enhancing the interworking between cellular communication systems and WLAN systems in the level of radio access networks (RAN) (see Non-patent document 1).

On the other hand, in order to achieve efficient access point discovery processes performed by user terminals, the standardization of ANDSF (Access Network Discovery and Selection Function) is currently in progress. In ANDSF, ANDSF servers provided in core networks provide information regarding the WLAN to user terminals by NAS (Non Access Stratum) messages.

Prior Art Document

[Non-patent Document]
[Non-patent document 1] 3GPP contribution RP-1201455

SUMMARY OF THE INVENTION

By the way, in order to enhance the RAN level cooperation between cellular communication systems and WLAN systems, it is preferable that cellular base stations know geographic locations of WLAN access points (In particular, WLAN access points provided in the own coverage area).

Here, cellular base stations acquire the access point location information regarding geographic locations of WLAN access points from the ANDSF servers, and thereby it is considered that the cellular base stations can know the geographic locations of the WLAN access points.

However, the ANDSF is an optional function, and interfaces between cellular base stations and ANDSF servers may not exist. Therefore, a case where cellular base stations can't acquire the access point location information from the ANDSF servers is supposed. In such case, it is difficult for cellular base stations to know the geographic locations of WLAN access points.

Then, the object of the present invention is to enable the cellular base station to know the geographic location of the WLAN access point even when the cellular base station can't acquire the access point location information from the ANDSF server.

A communication control method according to a first aspect includes: a step A of acquiring, by a user terminal that supports a cellular communication and a WLAN communication, access point location information on a geographical location of a WLAN access point; a step B of transmitting, from the user terminal to a cellular network, the access point location information; and a step C of acquiring, by a cellular base station included in the cellular network, the access point location information.

A user terminal according to a second aspect supports a cellular communication and a WLAN communication. The user terminal includes a controller configured to acquire access point location information on a geographical location of a WLAN access point. The controller transmits the access point location information to a cellular network.

BRIEF DESCRIPTION OF THE DRAWINGS

FIG. 11 is an operation sequence diagram according to the fourth embodiment.
FIG. 12 is an operation sequence diagram according to the fifth embodiment.

DESCRIPTION OF THE EMBODIMENTS

Overview of the Embodiments

Figure 1:
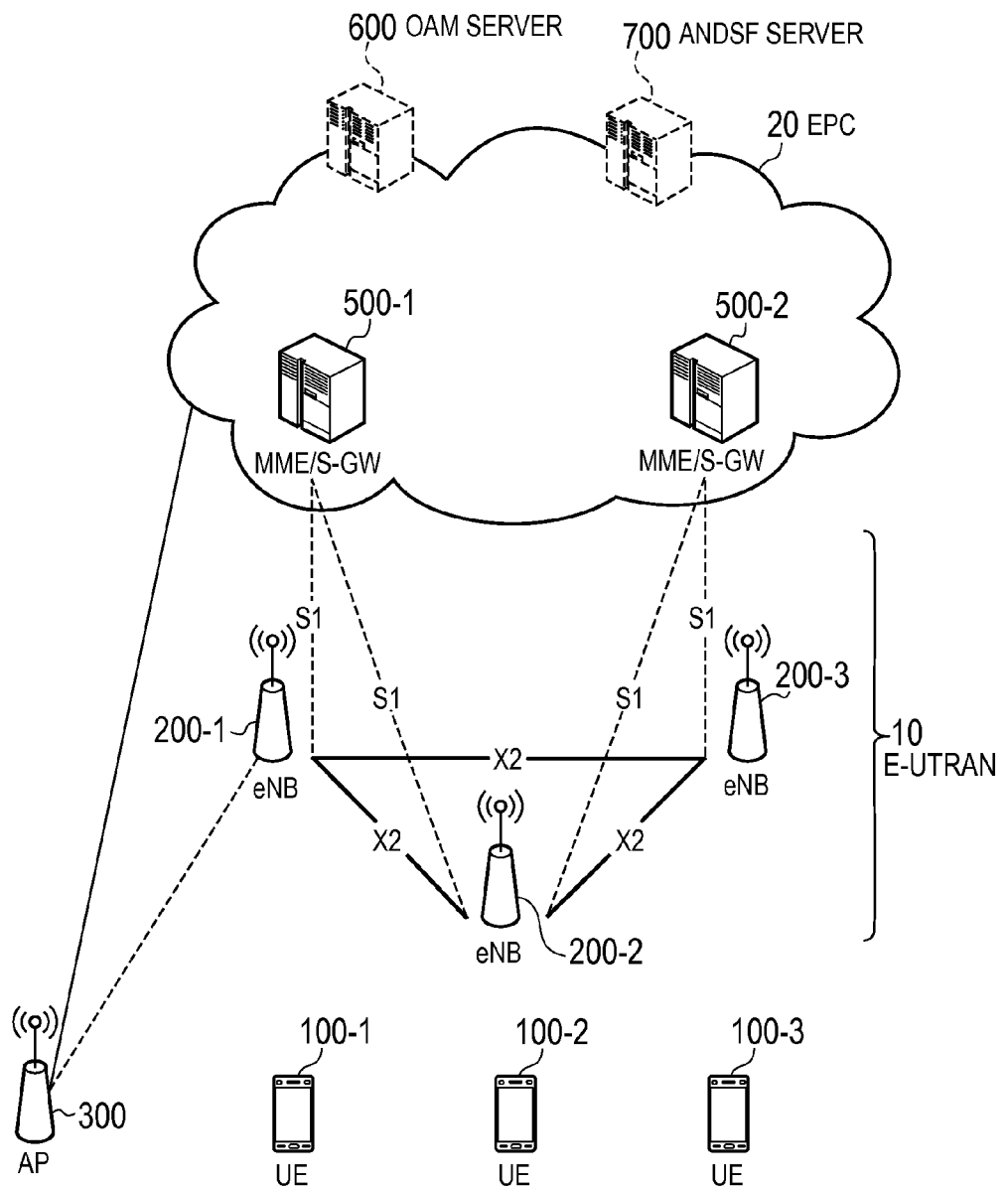
FIG. 1 is a system configuration diagram according to a first embodiment to a fifth embodiment.

A communication control method according to a first embodiment to a fifth embodiment includes: a step A of acquiring, by a user terminal that supports a cellular communication and a WLAN communication, access point location information on a geographical location of a WLAN access point; a step B of transmitting, from the user terminal to a cellular network, the access point location information; and a step C of acquiring, by a cellular base station included in the cellular network, the access point location information.

In the first embodiment to the third embodiment, and the fifth embodiment, in the step A, the user terminal positioned within a coverage area of the WLAN access point acquires the access point location information by measuring information indicating a geographical location of the user terminal.

In the first embodiment to the third embodiment, in the step A, the user terminal acquires the access point location information on the basis of MDT-associated information configured from the cellular network.

In the first embodiment to the third embodiment, the MDT-associated information includes information for requesting a measurement of the WLAN access point.

In the first embodiment to the third embodiment, the MDT-associated information includes an identifier indicating a WLAN access point arranged within a coverage area of the cellular base station, as a WLAN access point to be measured.

In the first embodiment to the third embodiment, in the step A, the user terminal acquires received power information indicating a received power from the WLAN access point, along with the access point location information, on the basis of the MDT-associated information.

In the first embodiment, the step A includes: a step of acquiring, by the user terminal in an idle state of the cellular communication, the access point location information, on the basis of the MDT-associated information; and a step of storing, by the user terminal in the idle state, the access point location information. In the step B, the user terminal transmits the access point location information to a server apparatus included in the cellular network. In the step C, the cellular base station acquires the access point location information from the server apparatus.

In the second embodiment, the step A includes: a step of acquiring, by the user terminal in a connected state of the cellular communication, the access point location information, on the basis of the MDT-associated information; and a step of storing, by the user terminal in the connected state, the access point location information.

In the second embodiment, the method further includes, prior to the step B, a step of transmitting, from the user terminal to the cellular network, notification information indicating that the user terminal is storing the access point location information.

In the third embodiment, in the step A, the user terminal in the connected state of the cellular communication acquires the access point location information, on the basis of the MDT-associated information. In the step B, the user terminal transmits the access point location information, without retaining the access point location information, to the cellular network.

In the third embodiment, the MDT-associated information includes trigger information for triggering an acquisition of the access point location information and/or triggering a transmission of the access point location information.

In the second embodiment and the third embodiment, in the step B, the user terminal transmits the access point location information to the cellular base station. In the step C, the cellular base station acquires the access point location information transmitted from the user terminal.

In the second embodiment and the third embodiment, in the step B, the user terminal transmits the access point location information to a server apparatus included in the cellular network. In the step C, the cellular base station acquires the access point location information from the server apparatus.

In the fourth embodiment, in the step A, the user terminal that supports an ANDSF acquires ANDSF information including the access point location information, from an ANDSF server. In the step B, the user terminal transmits the access point location information included in the ANDSF information, to the cellular base station, in response to a request from the cellular base station. In the step C, the cellular base station acquires the access point location information transmitted from the user terminal.

In the fourth embodiment, the communication control method further includes, prior to the step B, a step of transmitting, from user terminal to the cellular base station, information indicating whether the ANDSF is supported or information indicating whether to have the ANDSF information including the access point location information.

In the fourth embodiment, the communication control method further includes a step of transmitting the request from the cellular base station to the user terminal. The request from the cellular base station includes an identifier indicating a WLAN access point arranged within a coverage area of the cellular base station.

In the fifth embodiment, the step A includes: a step of acquiring, by the user terminal, the access point location information corresponding to a WLAN access point for which the user terminal has an access right; and a step of managing a list including the access point location information. In the step B, the user terminal transmits the access point location information included in the list, to the cellular network, in response to a request from the cellular base station.

In the fifth embodiment, in the step B, the user terminal transmits the access point location information to the cellular base station. In the step C, the cellular base station acquires the access point location information transmitted from the user terminal In the fifth embodiment, in the step B, the user terminal transmits the access point location information to a server apparatus included in the cellular network. In the step C, the cellular base station acquires the access point location information from the server apparatus.

In the fifth embodiment, the communication control method further includes, prior to the step B, a step of transmitting, from the user terminal to the cellular base station, information indicating whether the user terminal is having the list including the access point location information.

In the fifth embodiment, the communication control method further includes a step of transmitting the request from the cellular base station to the user terminal. The request from the cellular base station includes an identifier indicating a WLAN access point arranged within a coverage area of the cellular base station.

A user terminal according to the first embodiment to the fifth embodiment supports a cellular communication and a WLAN communication. The user terminal includes a controller configured to acquire access point location information on a geographical location of a WLAN access point. The controller transmits the access point location information to a cellular network.

First Embodiment

With reference to drawings, embodiments of a case where a cellular communication system (a LTE system) configured in compliance with the 3GPP standards cooperates with a wireless LAN (WLAN) system will be described below.

(System Configuration)

FIG. 1 is a system configuration diagram according to the first embodiment. As shown in FIG. 1, the cellular communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a radio access network (RAN). The EPC 20 corresponds to a core network. The E-UTRAN 10 and the EPC 20 configures a network (i.e., a cellular network) of the cellular communication system.

The UE 100 is a mobile radio communication device and performs a radio communication with a cell with which a connection is established. The UE 100 corresponds to a user terminal. The UE 100 is a terminal (dual terminal) that supports communication schemes of both a cellular communication and a WLAN communication.

The E-UTRAN 10 includes a plurality of eNBs 200 (evolved Node-Bs). The eNB 200 corresponds to a cellular base station. The eNB 200 manages one or more cells and performs a radio communication with a UE 100 which establishes a connection with the own cell. It is noted that the "cell" is used as a term indicating a minimum unit of a radio communication area, and is also used as a term indicating a function performing radio communication with the UE 100. Further, the eNB 200, for example, has a radio resource management (RRM) function, a routing function of user data, and a measurement control function for mobility control and scheduling.

The eNBs 200 are connected mutually via an X2 interface. Further, the eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node that performs various mobility controls and the like for the UE 100 and corresponds to a control station. The S-GW is a network node that performs the transfer control of user data and corresponds to a switching center.

The WLAN system includes WLAN access points (hereinafter simply referred to as "APs") 300. The AP 300 is an AP (Operator controlled AP) managed by an operator of the cellular communication system.

The WLAN system is configured in compliance with various IEEE 802.11 standards, for example. The AP 300 communicates with the UE 100 in a frequency band (WLAN frequency band) different from a cellular frequency band. The AP 300 is connected to the EPC 20 via routers and the like.

It is not limited to the case in which the eNB 200 and the AP 300 are individually located. The eNB 200 and the AP 300 may be collocated at the same place. The eNB 200 and the AP 300 may be directly connected to each other through an arbitrary interface of an operator, as one collocated configuration.

The EPC 20 further includes an OAM (Operation and Maintenance) server 600. The OAM server 600 is a server apparatus for the operation and maintenance of a cellular network.

The EPC 20 further includes an ANDSF server 700. The ANDSF server 700 manages ANDSF information regarding the WLAN. The ANDSF server 700 provides the ANDSF information regarding the WLAN to the UE 100 by NAS messages. In the first embodiment (as well as the second embodiment, the third embodiment, and the fifth embodiment), the ANDSF server 700 may not necessarily be provided.

Next, the configurations of the UE 100, the eNB 200, and the AP 300 will be described.

Figure 2:
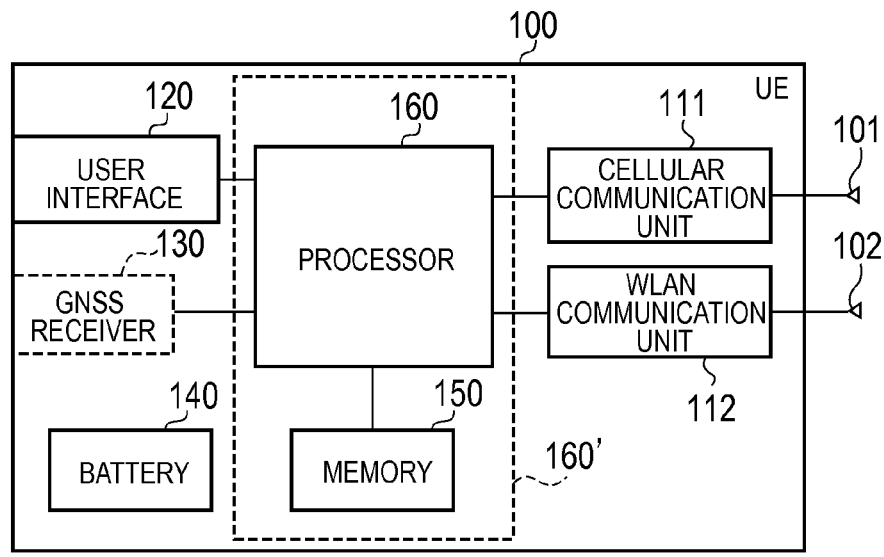
FIG. 2 is a block diagram of a UE (user terminal) according to the first embodiment to the fifth embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 configures a controller. The UE 100 may not have the GNSS receiver 130. Furthermore, the memory 150 may be integrally configured with the processor 160, and this set (i.e., a chipset) may be called a processor 160'.

The antenna 101 and the cellular communication unit 111 are used for transmitting and receiving a cellular radio signal. The cellular communication unit 111 converts a baseband signal output from the processor 160 into a cellular radio signal, and transmits it from the antenna 101. The cellular communication unit 111 converts a cellular radio signal received by the antenna 101 into a baseband signal, and outputs it to the processor 160.

The antenna 102 and the WLAN communication unit 112 are used for transmitting and receiving a WLAN radio signal. The WLAN communication unit 112 converts a baseband signal output from the processor 160 into a WLAN radio signal, and transmits it from the antenna 102. The WLAN communication unit 112 converts a WLAN radio signal received by the antenna 102 into a baseband signal, and outputs it to the processor 160.

The user interface 120 is an interface with a user carrying the UE 100, and includes a display, a microphone, a speaker, and various buttons, for example. Upon receipt of an input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 stores a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on a baseband signal, and a CPU that performs various processes by executing the program stored in the memory 150. The processor 160 may further include a codec that performs encoding and decoding on sound and video signals. The processor 160 executes various processes and various communication protocols described later.

Figure 3:
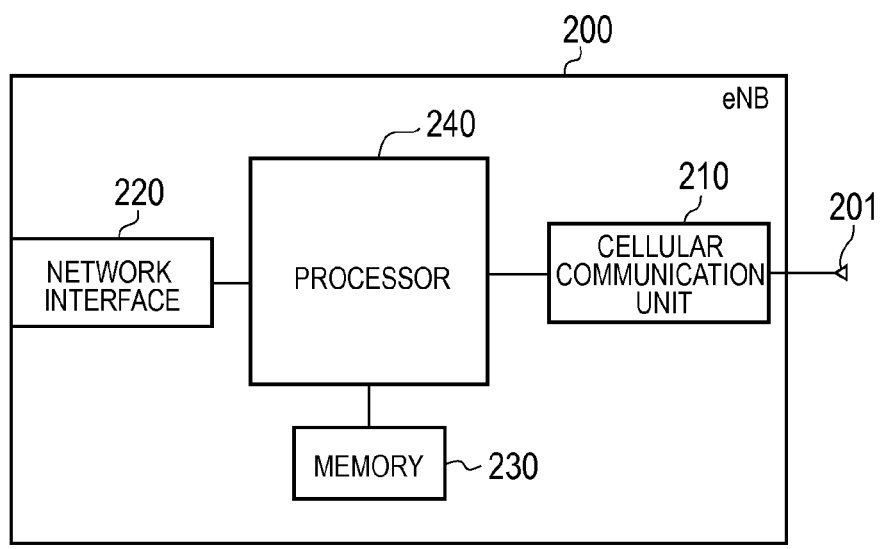
FIG. 3 is a block diagram of an eNB (cellular base station) according to the first embodiment to the fifth embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configures a controller.

The antenna 201 and the cellular communication unit 210 are used for transmitting and receiving a cellular radio signal. The cellular communication unit 210 converts a baseband signal output from the processor 240 into a cellular radio signal, and transmits it from the antenna 201. Furthermore, the cellular communication unit 210 converts a cellular radio signal received by the antenna 201 into a baseband signal, and outputs it to the processor 240.

The network interface 220 is connected to a neighboring eNB 200 via the X2 interface and is connected to the MME/S-GW 500 via the S1 interface. The network interface 220 is also used for a communication with the AP 300 via the EPC 20.

The memory 230 stores a program to be executed by the processor 240 and information to be used for a process by the processor 240. The processor 240 includes a baseband processor that performs modulation and demodulation, encoding and decoding and the like on a baseband signal, and a CPU that performs various processes by executing the program stored in the memory 230. The processor 240 executes various processes and various communication protocols described later.

Figure 4:
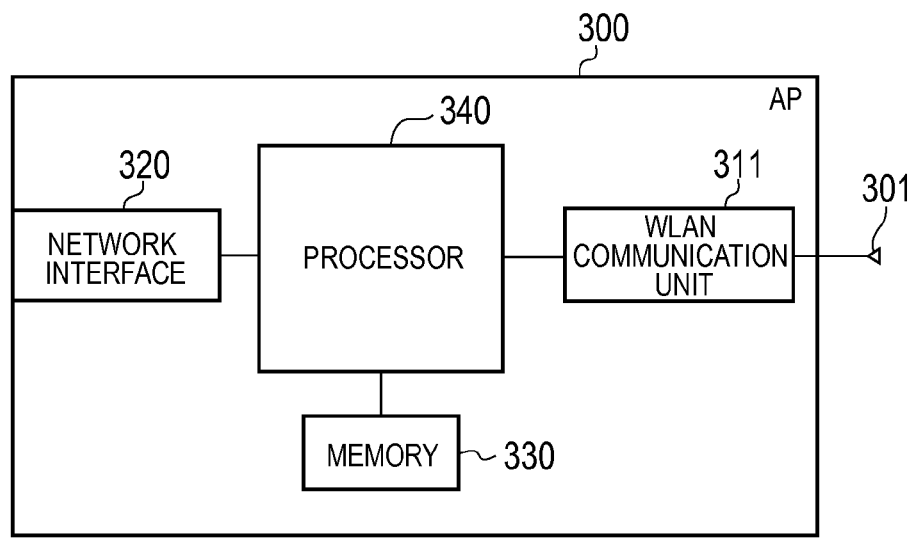
FIG. 4 is a block diagram of an AP (access point) according to the first embodiment to the fifth embodiment.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving a WLAN radio signal. The WLAN communication unit 311 converts a baseband signal output from the processor 340 into a WLAN radio signal, and transmits it from the antenna 301. The WLAN communication unit 311 converts a WLAN radio signal received by the antenna 301 into a baseband signal, and outputs it to the processor 340.

The network interface 320 is connected to the EPC 20 via routers, etc. Further, the network interface 320 is used for a communication with the eNB 200 via the EPC 20.

The memory 330 stores a program to be executed by the processor 340 and information to be used for a process by the processor 340. The processor 340 includes a baseband processor that performs modulation and demodulation, encoding and decoding and the like on the baseband signal, and a CPU that executes various processes by executing the program stored in the memory 330.

Figure 5:
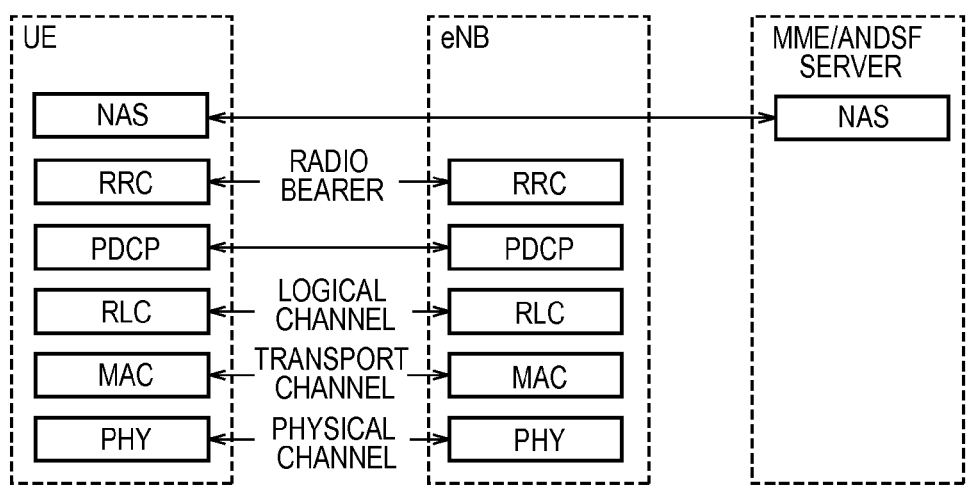
FIG. 5 is a protocol stack diagram of a radio interface in a LTE system.

FIG. 5 is a protocol stack diagram of a radio interface in the cellular communication system. As shown in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via physical channels.

The MAC layer performs priority control of data, and a retransmission process and the like by hybrid ARQ (HARQ). Between the MAC layer of the UE 100 and the MAC layer of the eNB 200, data is transmitted via transport channels. The MAC layer of the eNB 200 includes a scheduler that selects a transport format (a transport block size, a modulation and coding scheme and the like) of an uplink and a downlink, and resource blocks to be assigned.

The RLC layer transmits data to an RLC layer of a reception side by using the functions of the MAC layer and the PHY layer. Between the RLC layer of the UE 100 and the RLC layer of the eNB 200, data is transmitted via logical channels.

The PDCP layer performs header compression and decompression, and encryption and decryption.

The RRC layer is defined only in a control plane. Between the RRC layer of the UE 100 and the RRC layer of the eNB 200, control messages (RRC messages) for various settings are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state) of cellular communication, otherwise, the UE 100 is in an idle state (RRC idle state) of cellular communication.

A NAS (Non-Access Stratum) layer positioned above the RRC layer performs session management, mobility management and the like. The MME 300 and the ANDSF server 700 exchange NAS messages with UE 100.

(Operation According to the First Embodiment)

An operation according to the first embodiment will be described below.

(1) Operational Environment

Figure 6:
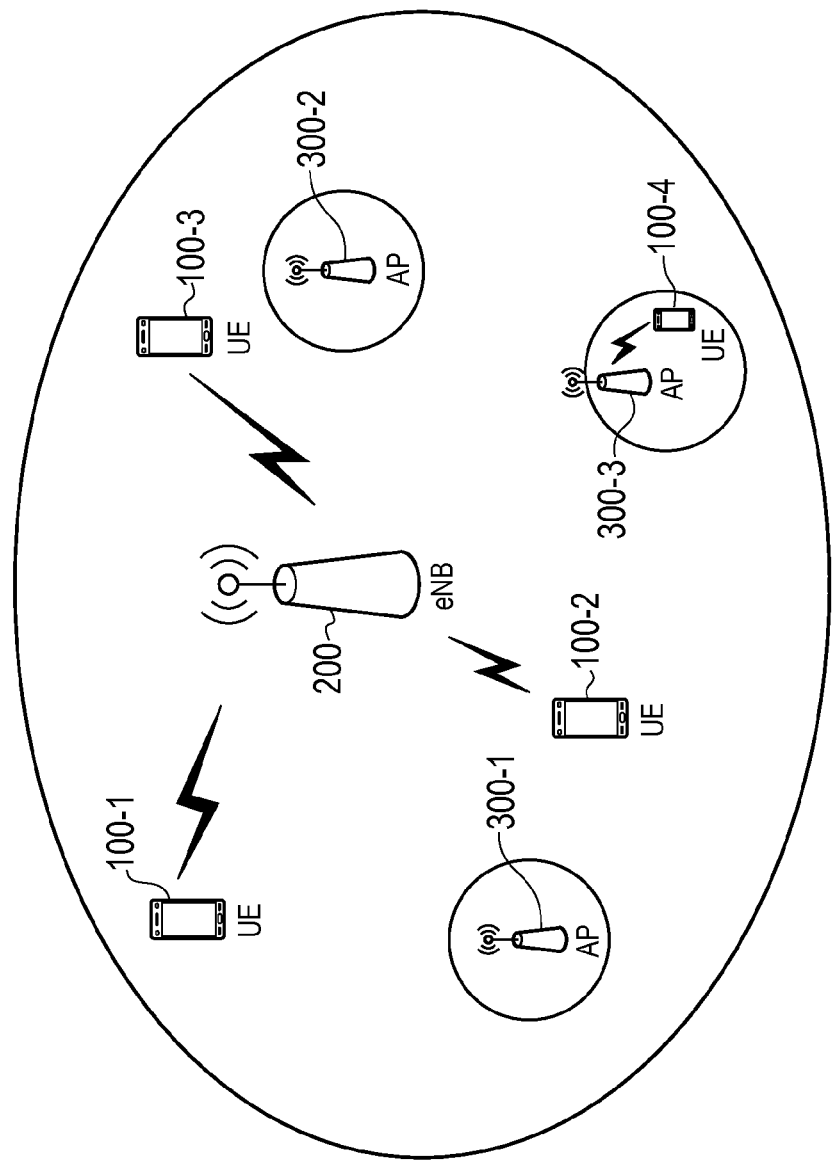
FIG. 6 is a diagram illustrating the operational environment according to the first embodiment to the fifth embodiment.

FIG. 6 is a diagram illustrating an operational environment according to the first embodiment. As shown in FIG. 6, a plurality of APs 300 are provided within a coverage area of the eNB 200. The AP 300 is an AP (Operator controlled AP) managed by an operator.

A plurality of UEs 100 are located within a coverage area of the AP 300, and within the coverage area of the eNB 200. The UE 100 establishes a connection with the eNB 200, and is performing a cellular communication with the eNB 200. In particular, the UE 100 transmits and receives cellular radio signals including traffic (user data) from/to the eNB 200. Alternatively, some UEs 100 may not establish a connection with the eNB 200.

Here, in order to enhance a RAN level cooperation between the cellular communication system and the WLAN system, it is preferable that the eNB 200 knows a geographic location of the AP 300 (In particular, AP 300 provided in the own coverage area).

However, as described above, a case where the eNB 200 can't acquire AP location information from the ANDSF server 700 is supposed. In such case, it is difficult for the eNB 200 to know the geographic location of the AP 300.

So, the first embodiment expands a function of "Logged MDT in Idle" such that the eNB 200 can know the geographic location of the AP 300, even when the eNB 200 can't acquire the AP location information from the ANDSF server 700.

(2) Logged MDT in Idle

In MDT (Minimization of Drive Tests), the UE 100 measures a radio environment (MDT measurement), and reports a measurement result with the own location information to the cellular network side.

Here, a general Logged MDT (Logged MDT in Idle) will be described. The Logged MDT includes processes of a MDT measurement configuration (Measurement configuration), a MDT measurement (Measurement collection), and a measurement result reporting (Measurement reporting).

First, in the MDT measurement configuration, the UE 100 in connected state receives a MDT configuration message (Logged Measurement Configuration message) from a cellular network, and stores various MDT configuration parameters included in the MDT configuration message. The MDT configuration parameters includes a logging event, a logging period, and a network absolute time. Here, the logging refers to a sequence of actions of measuring the radio environment and storing the measurement result.

The logging event refers to an event for which the logging should be performed. Now, a periodic logging is specified and a logging interval is designated. The logging period refers to a period for which the logging should be performed. The period from an execution of the MDT measurement configuration to an end of the MDT measurement is designated. The network absolute time is reference time for a time stamp to be added to the measurement result of radio environment (hereinafter simply referred to as "measurement result").

Second, in the MDT measurement, the UE 100 in idle state performs the logging in accordance with the MDT configuration parameters (Configuration). In particular, the UE 100 measures the radio environment about a serving cell (and neighbor cell) when an event corresponding to the logging event occurs. The radio environment is a reference signal received power (RSRP) and a reference signal received quality (RSRQ), for example.

The UE 100 stores the measurement result along with location information and a time stamp. A combination of the measurement result, the location information, and the time stamp is referred to "measurement log". When the logging period expires, the UE 100 terminates the MDT measurement and activates a timer defining a period (48 hours in specs) for which the measurement result (measurement log) should be retained.

Third, in the measurement result reporting, the UE 100 transmits notification information (referred to as "availability indicator" in specs) indicating that the UE 100 is retaining the measurement result, to the cellular network, at a time of transition from an idle state to a connected state or a handover and the like.

The cellular network requests, to the UE 100, a transmission (reporting) of measurement result based on the availability indicator. The UE 100 transmits the measurement result (measurement log) to the cellular network in response to a request from the cellular network. The cellular network performs a network optimization such as coverage problem resolution based on the measurement result (measurement log) from the UE 100.

(3) Operation Sequence According to the First Embodiment

Figure 7:
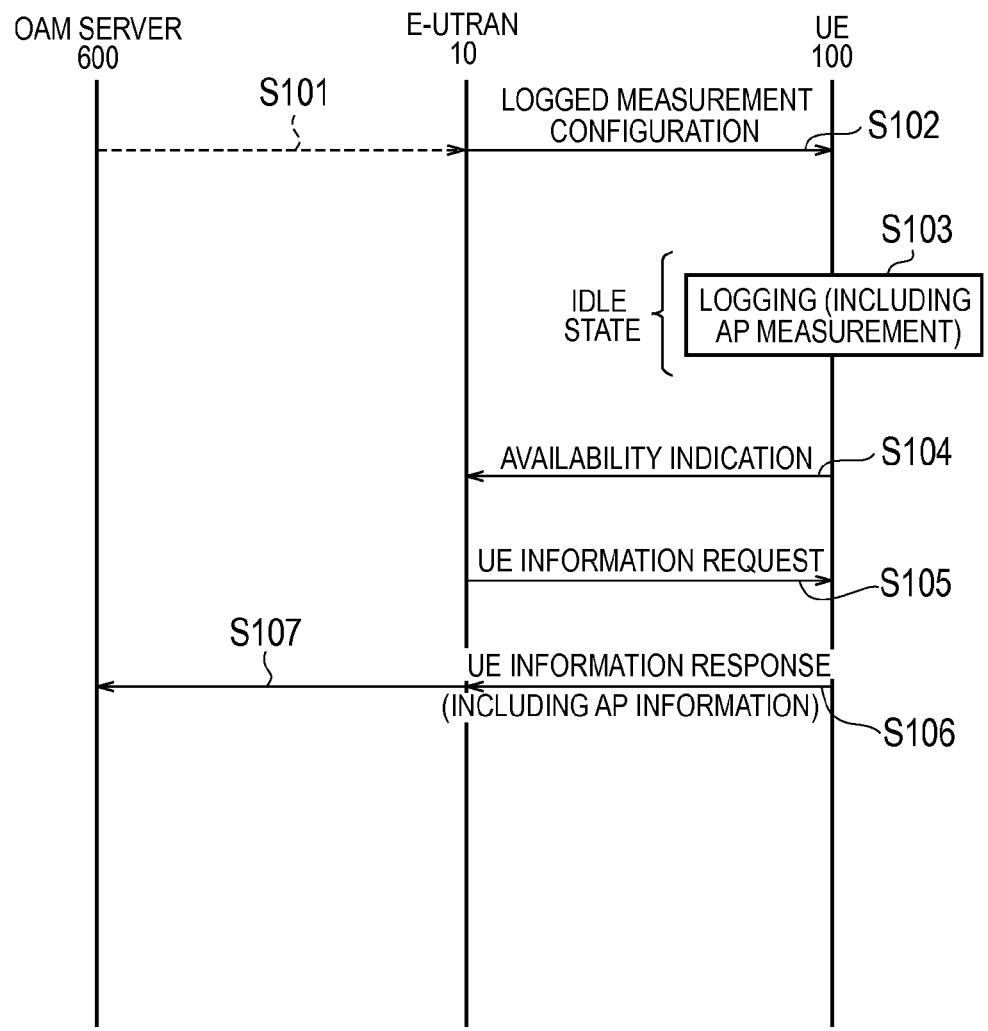
FIG. 7 is an operation sequence diagram according to the first embodiment.
Figure 8:
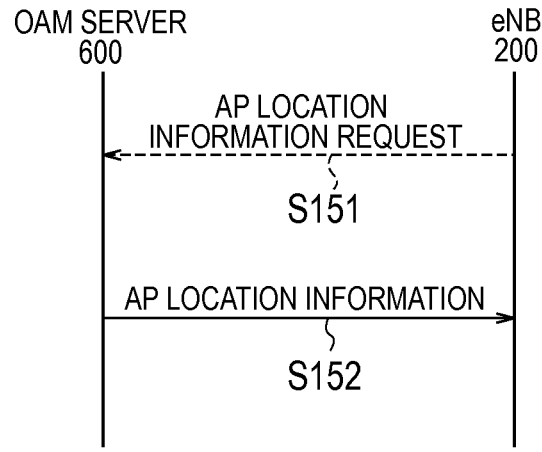
FIG. 8 is an operation sequence diagram according to the first embodiment.

As described above, the first embodiment enables the eNB 200 to know the geographic location of AP 300 by expanding the function of the Logged MDT (Logged MDT in Idle). FIG. 7 and FIG. 8 are operation sequence diagrams according to the first embodiment.

As shown in FIG. 7, in step S101, the OAM server 600 requests an execution of Logged MDT in Idle, to the eNB 200 included in the E-UTRAN 10. However, step S101 may be omitted.

In step S102, the eNB 200 transmits a Logged Measurement Configuration message, to the UE 100 in connected state. In the first embodiment, the Logged Measurement Configuration message corresponds to MDT-associated information.

The Logged Measurement Configuration message may include information (hereinafter referred to as "AP measurement request") for requesting a measurement of AP 300 in addition to the aforementioned MDT configuration parameters. The Logged Measurement Configuration message may include identifiers (hereinafter referred to as "AP identifier") of APs 300 provided in the coverage area of the eNB 200, as measurement target AP 300. The AP identifier is a SSID (Service Set Identifier) or a BSSID (Basic Service Set Identifier). The UE 100 stores the MDT configuration parameters included in the Logged Measurement Configuration message. Furthermore, with the Logged Measurement Configuration message, the eNB 200 may transmit information for requesting to include detailed location information obtained from the GNSS receiver 130, to the UE 100.

In step S103, the UE 100 which has transitioned to idle state from connected state performs the logging in accordance with the MDT configuration parameters. In the first embodiment, the UE 100 performs the logging of AP 300, in addition to the logging of a cellular communication serving cell (and neighbor cell), or in place of the logging of a cellular communication serving cell (and neighbor cell). The UE 100 may perform the logging of AP 300 autonomously, provided that the WLAN communication unit 112 is an ON state, even when the AP measurement request is not included in the MDT configuration parameters.

The UE 100 measures a radio environment regarding measurable APs 300 during the logging of AP 300. The radio environment regarding AP 300 is a received power of a WLAN radio signal (e.g., beacon signal) received from the AP 300, for example. The UE 100 stores the measurement result (hereinafter referred to as "AP measurement result") on the AP 300 along with location information and a time stamp. The AP measurement result includes AP identifiers.

In the first embodiment, a combination of the AP measurement result, the location information, and the time stamp is referred to as "AP information". The location information corresponding to the AP measurement result is referred to as "AP location information".

In step S104, the UE 100 transmits an availability indicator indicating that the UE 100 is retaining the measurement result, to the eNB 200 included in E-UTRAN 10, at a transition from idle state to connected state or a handover and the like.

In step S105, the eNB 200 that has received the availability indicator requests a transmission (reporting) of the measurement result, to the UE 100.

In steps S106 and S107, the UE 100 transmits the retained measurement result (including AP information) to the OAM server 600 via the eNB 200 in response to a request from the eNB 200.

The OAM server 600 acquires the measurement result (including AP information) from the UE 100. In the first embodiment, the OAM server 600 manages location information (AP location information) per AP 300 based on the AP measurement result and the location information included in the AP information. The OAM server 600 may manage the location information of AP 300 in association with the coverage area (cell) including the AP 300 based on a cellular measurement result and the AP measurement result. The OAM server 600 provides the AP location information to the eNB 200.

As shown in FIG. 8, in step S151, the eNB 200 requests a provision of AP location information to the OAM server 600. However, step S151 may be omitted.

In step S152, the OAM server 600 transmits the AP location information to the eNB 200. For example, the OAM server 600 transmits the location information of AP 300 provided in the coverage area (cell) of the eNB 200, to the eNB 200. Thus, the eNB 200 acquires the AP location information from the OAM server 600.

(Conclusion of the First Embodiment)

In the first embodiment, the UE 100 in idle state acquires the AP location information and retains the AP location information. Then, the UE 100 transmits the AP location information to the OAM server 600 included in the cellular network. The eNB 200 acquires the AP location information from the OAM server 600. Therefore, the eNB 200 can know the geographic location of AP 300 by expanding the function of "Logged MDT in Idle", even when there is no ANDSF server 700 or there is no interface between the ANDSF server 700 and the eNB 200.

Second Embodiment

For the second embodiment, differences with the above-described first embodiment will be mainly described. The second embodiment enables the eNB 200 to know the geographic location of AP 300 by means of "Logged MDT in Connected". The system configuration and the operational environment according to the second embodiment are similar to the first embodiment (Operation According to the Second Embodiment)

The operation according to the second embodiment will be described below.

(1) Logged MDT in Connected

The Logged MDT in Connected is one type of Logged MDT, but the MDT measurement is performed by the UE 100 in connected state. Here, differences between the Logged MDT in Connected and the Logged MDT in Idle will be mainly described.

First, in MDT measurement configuration, the UE 100 in connected state receives a MDT configuration message (Connected MDT Configuration message) from a cellular network, and stores various MDT configuration parameters included in the MDT configuration message.

Second, in MDT measurement, the UE 100 in connected state performs the logging in accordance with the MDT configuration parameters (Configuration).

Third, in measurement result reporting, the UE 100 transmits the measurement result (measurement log) to the cellular network in response to a request from the eNB 200. The cellular network performs a network optimization such as coverage problem resolution based on the measurement result (measurement log) from the UE 100.

(2) Operation Sequence According to Second Embodiment

Figure 9:
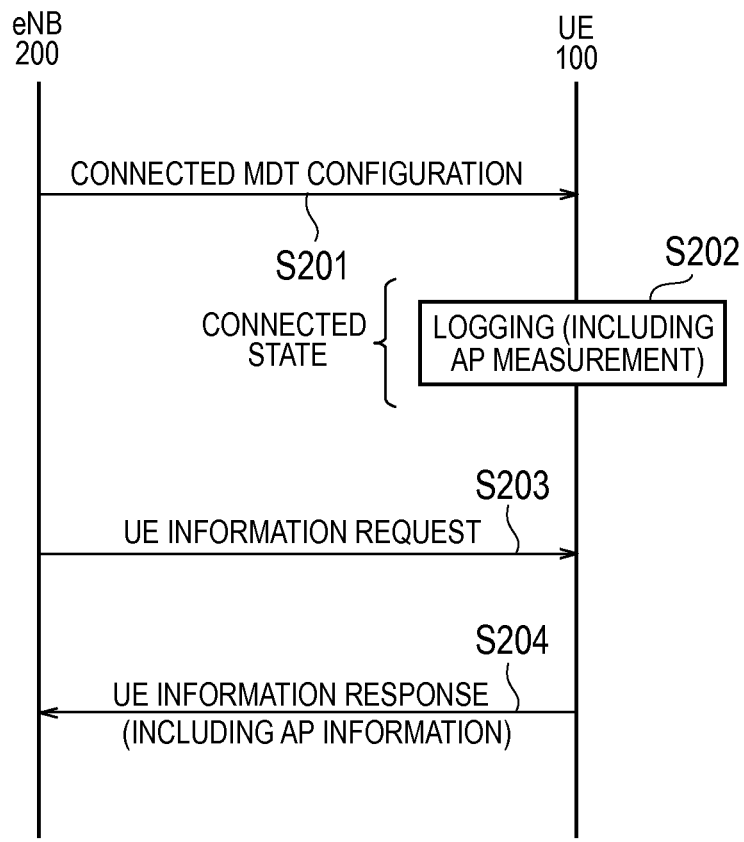
FIG. 9 is an operation sequence diagram according to the second embodiment.

As described above, the second embodiment enables the eNB 200 to know the geographic location of AP 300 by means of the Logged MDT in Connected. FIG. 9 is an operation sequence diagram according to the second embodiment.

As shown in FIG. 9, in step S201, the eNB 200 transmits the Connected MDT Configuration message to the UE 100 in connected state. In the second embodiment, the Connected MDT Configuration message corresponds to MDT-associated information.

The Connected MDT Configuration message may include information (AP measurement request) for requesting a measurement of AP 300 in addition to the aforementioned MDT configuration parameters. The Connected MDT Configuration message may include identifiers (AP identifier) indicating APs 300 provided within the coverage area of the eNB 200, as measurement target AP 300. The UE 100 includes MDT configuration parameters included in the Connected MDT Configuration message.

In the second embodiment, the Connected MDT Configuration message may include information (hereinafter referred to as "WLAN ON request") for requesting to turn on the WLAN communication unit 112. Furthermore, the Connected MDT Configuration message may include information for requesting to include detailed location information obtained from the GNSS receiver 130. Alternatively, the eNB 200 may transmit information for requesting to include detailed location information obtained from the GNSS receiver 130 along with the Connected MDT Configuration message, to the UE 100.

In step S202, the UE 100 in connected state performs the logging in accordance with the MDT configuration parameters. In the second embodiment, the UE 100 performs the logging of AP 300 in place of the logging of a cellular communication serving cell (and neighbor cell), or in addition to the logging of a cellular communication serving cell (and neighbor cell).

The UE 100 may perform the logging of AP 300 autonomously, provided that the WLAN communication unit 112 is an ON state, even when the AP measurement request is not included in the MDT configuration parameters. When an AP identifier is included in the MDT configuration parameters, the UE 100 may perform the logging for the AP identifier. Furthermore, when the WLAN communication unit 112 is an OFF state and an AP identifier is included in the MDT configuration parameters, the UE 100 may turn on the WLAN communication unit 112 autonomously without an explicit "WLAN ON" request.

In the logging of AP 300, the UE 100 measures the radio environment about measurable AP 300. The radio environment about measurable AP 300 refers to the received power of a WLAN radio signal (e.g., beacon signal) received from the AP 300, for example. The UE 100 stores the measurement result (AP measurement result) about the AP 300 along with location information and time stamp. The AP measurement result includes AP identifiers. In the second embodiment, a combination of the AP measurement result, the location information, and the time stamp is referred to as "AP information". The location information corresponding to the AP measurement result is referred to as "AP location information".

In step S203, the eNB 200 requests a transmission (reporting) of the measurement result, to the UE 100. For example, when the eNB 200 determines to disconnect a connection with the UE 100, the eNB 200 requests a transmission (reporting) of the measurement result, to the UE 100, before the eNB 200 performs a process of disconnecting the connection with the UE 100.

In step S204, the UE 100 transmits the stored measurement result (including AP information) to the eNB 200 in response to a request from the eNB 200. The eNB 200 receives the measurement result (including AP information) from the UE 100.

(Conclusion of the Second Embodiment)

In the second embodiment, the UE 100 in connected state acquires the AP location information and stores the AP location information. Then, the UE 100 transmits the AP location information to the eNB 200. The eNB 200 acquires the AP location information transmitted from the UE 100. Therefore, the eNB 200 can know the geographic location of the AP 300 by means of the Logged MDT in Connected, even when there is no ANDSF server 700 or there is no interface between the ANDSF server 700 and the eNB 200.

[Modification 1 of the Second Embodiment]

In the aforementioned second embodiment, the eNB 200 acquires the AP information (including AP location information) from the UE 100 directly. However, the OAM server 600 may provide the AP information to eNB 200, similar to the aforementioned first embodiment. Specifically, the UE 100 transmits the AP information to the OAM server 600. The eNB 200 acquires the AP information from the OAM server 600.

[Modification 2 of the Second Embodiment]

In the aforementioned second embodiment, the eNB 200 requests the transmission (reporting) of the measurement result, to the UE 100, in step S203. However, the UE 100 may transmit the measurement result or an availability indicator, without performing the request in step S203, when the measured received power from an AP 300 falls below a threshold for example.

Third Embodiment

For the second embodiment, differences with the above-described first embodiment will be mainly described. The second embodiment enables the eNB 200 to know the geographic location of AP 300 by expanding the function of "Immediate MDT". The system configuration and the operational environment according to the third embodiment are similar to the first embodiment.

(Operation According to the Third Embodiment)

The operation according to the second embodiment will be described below.

(1) Immediate MDT

Here, a general Immediate MDT will be described. The Immediate MDT is one type of MDT and is performed by adding location information to a measurement report for a mobility control. That is, in the Immediate MDT, the UE 100 reports a measurement result to the eNB 200 immediately, without retaining the measurement result until the measurement can be reported.

First, the UE 100 in connected state receives a measurement configuration message (Measurement Configuration message) from a cellular network, and stores various measurement configuration parameters included in the Measurement Configuration message. The measurement parameters include a report trigger which is a trigger to transmit a measurement report. In the Immediate MDT, the Measurement Configuration message includes information (referred to as "Include Location Info" in specs) for requesting include location information.

Second, the UE 100 in connected state measures a radio environment of a serving cell (and neighbor cell). The radio environment is a reference signal received power (RSRP) and a reference signal received quality (RSRQ), for example. The UE 100 acquires location information.

Third, the UE 100 transmits a measurement report including the measurement result and the location information, when an event corresponding to the report trigger occurs.

(2) Operation Sequence According to Third Embodiment

Figure 10:
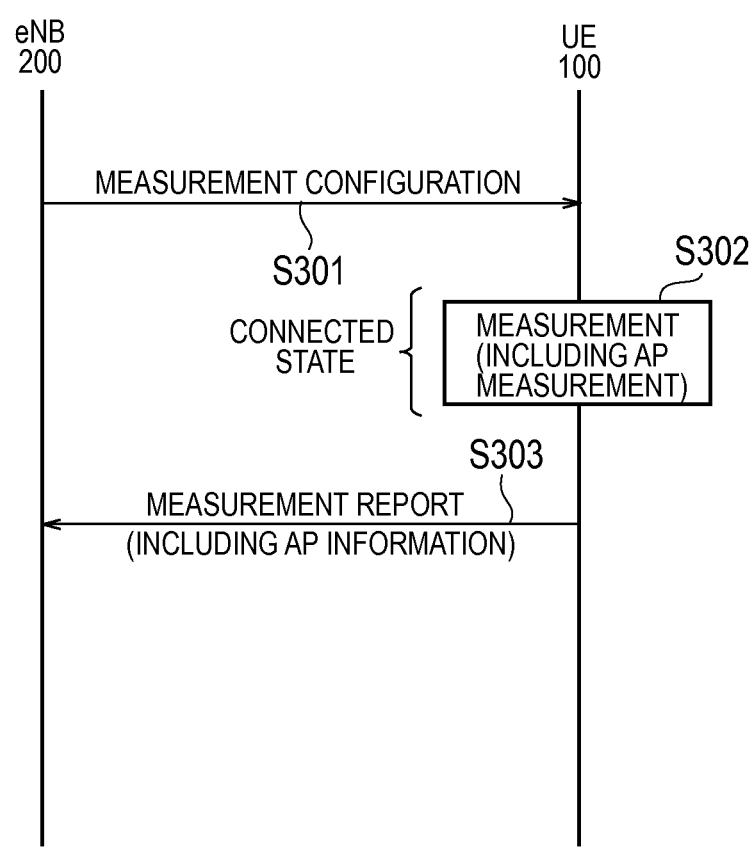
FIG. 10 is an operation sequence diagram according to the third embodiment.

As described above, the third embodiment enables the eNB 200 to know the geographic location of AP 300 by expanding the function of the Immediate MDT. FIG. 10 is an operation sequence diagram according to the third embodiment.

As shown in FIG. 10, in step S301, the eNB 200 transmits a Measurement Configuration message including the "Include Location Info" to the UE 100 in connected state. In the second embodiment, the Measurement Configuration message including the "Include Location Info" corresponds to MDT-associated information.

In the third embodiment, the measurement trigger included in the Measurement Configuration message is a trigger type defining an event regarding a radio environment of AP 300. The measurement trigger may be a trigger type "a radio environment of AP 300 is better than serving cell", for example. Alternatively, the Measurement Configuration message may include trigger information for triggering an acquisition of AP location information and/or a transmission of AP location information.

The Measurement Configuration message may include identifiers (AP identifier) indicating APs 300 provided in the coverage area of the eNB 200, as measurement target AP 300.

In the third embodiment, the Measurement Configuration message may include information (WLAN ON request) for requesting to turn on the WLAN communication unit 112. Furthermore, the Measurement Configuration message may include information for requesting to include detailed location information obtained from the GNSS receiver 130.

In step S302, the UE 100 in connected state performs a measurement in accordance with the Measurement Configuration message. In the third embodiment, the UE 100 performs a measurement of AP 300, in addition to the measurement of a cellular communication serving cell (and neighbor cell), or in place of the measurement of a cellular communication serving cell (and neighbor cell).

When the WLAN communication unit 112 is an OFF state and an AP identifier is included in the Measurement Configuration, the UE 100 may turn on the WLAN communication unit 112 autonomously without an explicit "WLAN ON" request In the measurement of AP 300, the UE 100 measures a radio environment about measurable APs 300. The radio environment of AP 300 refers to a received power of a WLAN radio signal (e.g., beacon signal) received from the AP 300, for example. When an AP identifier is included in the MDT configuration parameters, the UE 100 may perform the measurement for the AP identifier.

In step S303, the UE 100 transmits the measurement report including the measurement result (AP measurement result) and the location information, to the eNB 200. In the third embodiment, a combination of the AP measurement result and the location information is referred to as "AP information". The location information corresponding to the AP measurement result is referred to as "AP location information". The eNB 200 receives the measurement report from the UE 100.

(Conclusion of the Third Embodiment)

In the third embodiment, the UE 100 in connected state acquires the AP location information. The UE 100 transmits the AP location information to the eNB 200 without retaining the AP location information. The eNB 200 acquires the AP location information transmitted from the UE 100. Therefore, the eNB 200 can know the geographic location of the AP 300 by expanding the function of the Immediate MDT, even when there is no ANDSF server 700 or there is no interface between the ANDSF server 700 and the eNB 200.

[Modification of the Third Embodiment]

In the aforementioned third embodiment, the eNB 200 acquires the AP information from the UE 100 directly. However, the OAM server 600 may provide the AP information to eNB 200, similar to the aforementioned first embodiment. Specifically, the UE 100 transmits the AP information to the OAM server 600. The eNB 200 acquires the AP information from the OAM server 600.

Fourth Embodiment

For the fourth embodiment, differences with the above-described first embodiment to the third embodiment will be mainly described. In the fourth embodiment, the eNB 200 acquires AP location information from the UE 100 by utilizing ANDSF, without utilizing MDT. The system configuration and the operational environment according to the fourth embodiment are similar to the first embodiment.

(Operation According to the Fourth Embodiment)

The operation according to the second embodiment will be described below.

(1) ANDSF

Here, a general ANDSF will be described. The ANDSF server 700 (see FIG. 1) provides ANDSF information on AP 300 to the UE 100 by means of NAS messages. The ANDSF information includes a combination of AP identifiers and AP location information.

The UE 100 can efficiently discover APs 300 by performing an AP discovery process based on the ANDSF information. The UE 100 turns on the WLAN communication unit 112, in the proximity of a geographic location indicated by AP location information included in the ANDSF information, for example. Then, the UE 100 discover the AP 300 by searching (scanning) a beacon signal including an AP identifier included in the ANDSF information.

(2) Operation Sequence According to the Fourth Embodiment

FIG. 11 is an operation sequence diagram according to the fourth embodiment. Here, a case where the UE 100 supports the ANDSF is supposed.

As shown in FIG. 11, in step S401, the ANDSF server 700 provides ANDSF information on AP 300 to the UE 100 by means of NAS messages.

In step S402, the UE 100 stores the ANDSF information from the ANDSF server 700.

In step S403, the eNB 200 transmits inquiry information regarding the AP location information to the UE 100. The inquiry information is information for inquiring whether the UE 100 supports ANDSF, or information for inquiring whether the UE 100 has ANDSF information including the AP location information.

Alternatively, the inquiry information may be information for inquiring whether the UE 100 has ANDSF information including the AP location information on a specific AP 300 provided in the coverage area of the eNB 200. In this case, inquiry information includes AP the identifier of the specific AP 300.

In step S404, the UE 100 that has received the inquiry information transmits a response for the inquiry to the eNB 200. Specifically, the UE 100 transmits, to the eNB 200, information indicating whether the UE 100 supports ANDSF, or information indicating whether the UE 100 has ANDSF information including the AP location information.

In steps S403 and S404, the eNB 200 can decide whether the AP location information (ANDSF information) can be acquired from the UE 100. However, steps S403 and S404 are not mandatory and may be omitted.

In step S405, the eNB 200 requests a transmission of the ANDSF information including the AP location information, to the UE 100. The eNB 200 may request, to the UE 100, a transmission of the AP location information (ANDSF information) by designating a specific AP 300 provided in the own coverage area. In this case, the request from the eNB 200 includes an AP identifier of the specific AP 300.

In step S406, the UE 100 transmits the AP location information (ANDSF information) to the eNB 200 in response to the request from the eNB 200. When the AP identifier of the specific AP 300 is included in the request from the eNB 200, the UE 100 transmits AP location information (ANDSF information) corresponding to the AP identifier to the eNB 200. Alternatively, when the ANDSF information includes information on each AP 300 within a wide area, the UE 100 transmits AP location information (ANDSF information) to the eNB 200 with limiting to AP 300 near to the UE 100 (within a predetermined range from the current position).

(Conclusion of the Fourth Embodiment)

In the fourth embodiment, the UE 100 supporting ANDSF acquires ANDSF information including AP location information from the ANDSF server 700. The UE 100 transmits the AP location information included in the ANDSF information to the eNB 200 in response to a request from the eNB 200. The eNB 200 acquires the AP location information transmitted from the UE 100. Therefore, the eNB 200 can know the geographic location of the AP 300 even when there is no interface between the ANDSF server 700 and the eNB 200.

Fifth Embodiment

For the fifth embodiment, differences with the above-described first embodiment to the fourth embodiment will be mainly described. In the fifth embodiment, the eNB 200 acquires AP location information from the UE 100 by utilizing AP whitelists, without utilizing MDT or ANDSF. The system configuration and the operational environment according to the fifth embodiment are similar to the first embodiment.

(Operation According to the Fifth Embodiment)

The operation according to the fifth embodiment will be described below.

(1) AP Whitelist

The AP whitelist according to the fifth embodiment will be described. In the fifth embodiment, the UE 100 stores and manages an AP whitelist which is a list on APs 300 (operator controlled APs and the like) for which the own UE 100 has an access right. The AP whitelist includes AP identifiers of APs 300, and AP location information of the APs 300.

There are a case where the UE 100 updates the AP whitelist autonomously, a case where a cellular network sets the AP whitelist to the UE 100, and a case where these cases are combined.

The UE 100 updates the AP whitelist when an AP 300 notifies the UE 100 of information that the AP 300 is an operator controlled AP, after the UE 100 connects to the AP 300, in a case where the UE 100 updates the AP whitelist autonomously.

On the other hand, the UE 100 receives and stores the AP whitelist from the cellular network, in a case where the cellular network sets the AP whitelist to the UE 100. In this case, the AP whitelist may be managed per eNB 200 (or per cell) or per tracking area.

The UE 100 turns on the WLAN communication unit 112, in the proximity of a geographic location indicated by AP location information included in the AP whitelist, for example. Then, the UE 100 discover the AP 300 by searching (scanning) a beacon signal including an AP identifier included in the AP whitelist.

(2) Operation Sequence According to the Fifth Embodiment

FIG. 12 is an operation sequence diagram according to the fifth embodiment.

As shown in FIG. 12, in step S501, the UE 100 manages the AP whitelist.

In step S502, the eNB 200 transmits inquiry information regarding AP location information to the UE 100. The inquiry information is information for inquiring whether the UE 100 has the AP whitelist including the AP location information.

Alternatively, the inquiry information may be information for inquiring whether the UE 100 has the AP whitelist including the AP location information on a specific AP 300 provided in the coverage area of the eNB 200. In this case, inquiry information includes AP the identifier of the specific AP 300.

In step S503, the UE 100 that has received the inquiry information transmits a response for the inquiry to the eNB 200. Specifically, the UE 100 transmits, to the eNB 200, information indicating whether the UE 100 has the AP whitelist including the AP location information.

In steps S502 and S503, the eNB 200 can decide whether the AP location information (AP whitelist) can be acquired from the UE 100. However, steps S502 and S503 are not mandatory and may be omitted.

In step S504, the eNB 200 requests a transmission of the AP whitelist including the AP location information, to the UE 100. The eNB 200 may request, to the UE 100, a transmission of the AP location information (AP whitelist) by designating a specific AP 300 provided in the own coverage area. In this case, the request from the eNB 200 includes an AP identifier of the specific AP 300.

In step S505, the UE 100 transmits the AP location information (AP whitelist) to the eNB 200 in response to the request from the eNB 200. When the AP identifier of the specific AP 300 is included in the request from the eNB 200, the UE 100 transmits AP location information (AP whitelist)

corresponding to the AP identifier to the eNB 200. Alternatively, when the AP whitelist includes information on each AP 300 within a wide area, the UE 100 transmits AP location information (ANDSF information) to the eNB 200 with limiting to AP 300 near to the UE 100 (within a predetermined range from the current position).

(Conclusion of the Fifth Embodiment)

In the fifth embodiment, the UE 100 acquires AP location information corresponding to APs 300 for which the own UE 100 has an access right, and manages an AP whitelist including the AP location information. The UE 100 transmits the AP location information included the AP whitelist to the eNB 200 in response to a request from the eNB 200. The eNB 200 acquires the AP location information transmitted from the UE 100. Therefore, the eNB 200 can know the geographic location of the AP 300, even when there is no ANDSF server 700 or there is no interface between the ANDSF server 700 and the eNB 200.

[Modification of the Fifth Embodiment]

In the aforementioned fifth embodiment, the eNB 200 acquires the AP information from the UE 100 directly. However, the OAM server 600 may provide the AP information to eNB 200, similar to the aforementioned first embodiment. Specifically, the UE 100 transmits the AP information to the OAM server 600. The eNB 200 acquires the AP information from the OAM server 600.

OTHER EMBODIMENTS

The aforementioned first to fifth embodiments are not limited to implement separately. The embodiments may be implement by combining each other.

In the aforementioned first embodiment, Modification 1 of the second embodiment, Modification of the third embodiment, and Modification of the fifth embodiment, the OAM server 600 may calculate location information of APs 300 appeared to be statistically probable based on the information acquired from plural UEs 100 (and by several means).

In the aforementioned first to fifth embodiments, the detail of AP location information has not described especially. However, the information of AP 300 indicates the geographic location of the AP 300, and indicates the longitude and latitude of the AP 300. When considering a case where plural APs 300 are provided in different floors of the same building, the AP location information may include the altitude of AP 300 in addition to the longitude and latitude of the AP 300.

In the aforementioned first to fifth embodiments, although a use case of the AP location information in the eNB 200 has not described especially, there are use cases below for example.

The eNB 200 manages RAN level assistance information (RAN level WLAN discovery assistance information) for discovering APs 300 efficiently, based on acquired AP location information.

Then, the eNB 200 transmits the RAN level assistance information to UEs 100 by means of broadcasts. Thus, even when UEs 100 are unavailable for the ANDSF, each UE 100 within the coverage area of the eNB 200 can discover the AP 300 efficiently by performing the AP discovery process based on the RAN level assistance information.

The RAN level assistance information is configured as a part of system information block (SIB), since the RAN level assistance information is preferable to be received by not only connected state UEs 100 but also idle state UEs 100. The RAN level assistance information transmitted by an eNB 200 includes information on each AP 300 within the coverage area of the eNB 200. The RAN level assistance information includes identifiers of APs 300, location information of APs 300 and channel information of APs 300, for example.

Alternatively, the eNB 200 may transmit the RAN level assistance information by means of unicasts. The UE 100 transmits requesting information (hereinafter referred to as "RAN level assistance information request") for requesting a transmission of the RAN level assistance information, to the eNB 200. The RAN level assistance information request may be regard as an interest indication indicating an interest to the RAN level assistance information. The eNB 200 that has received the RAN level assistance information request transmits the RAN level assistance information to the UE 100 by means of unicasts. The unicast transmission of the RAN level assistance information can be achieved by transmitting the RAN level assistance information by means of a RRC messages, for example.

Although the LTE system has been described as one example of cellular communication systems in the aforementioned embodiments, the present invention is not limited to the LIE system. The present invention is applicable to other systems than the LTE system.

CROSS REFERENCE

The entire contents of U.S. provisional application No. 61/825,262 (filed on May 20, 2013) are incorporated herein by reference.

INDUSTRIAL APPLICABILITY

The present invention is useful in mobile communication fields.

The invention claimed is:
1. A communication control method comprising:
a step X of receiving, by a user terminal that supports a cellular communication and a WLAN communication transmitting, from a cellular base station included in a cellular network, Minimization of Drive Tests (MDT)-associated information including information for requesting a measurement of the WLAN access point;
a step A of acquiring, on the basis of the MDT-associated information, by the user terminal, access point location information on a geographical location of the WLAN access point;
a step Y of receiving, by the user terminal, a first request message from the base station, the first request message requesting transmission of a measurement result of the measurement of the WLAN access point;
a step B of transmitting, by the user terminal, in response to the first request message, to the cellular base station, the access point location information; and
a step C of receiving from the user terminal, by the cellular base station, the access point location information, wherein
the MDT-associated information includes an identifier indicating a WLAN access point arranged within a coverage area of the cellular base station, as a WLAN access point to be measured.
2. The communication control method according to claim 1, wherein
in the step A, the user terminal positioned within a coverage area of the WLAN access point acquires the access point location information by measuring information indicating a geographical location of the user terminal.

3. The communication control method according to claim 1, wherein
in the step A, the user terminal acquires received power information indicating a received power from the WLAN access point, along with the access point location information, on the basis of the MDT-associated information.

4. The communication control method according to claim 1, wherein the step A comprises steps of:
acquiring, by the user terminal in an idle state of the cellular communication, the access point location information, on the basis of the MDT-associated information; and
storing, by the user terminal in the idle state, the access point location information, wherein
in the step B, the user terminal transmits the access point location information to a server apparatus included in the cellular network, and
in the step C, the cellular base station acquires the access point location information from the server apparatus.

5. The communication control method according to claim 1, wherein the step A comprises steps of:
acquiring, by the user terminal in a connected state of the cellular communication, the access point location information, on the basis of the MDT-associated information; and
storing, by the user terminal in the connected state, the access point location information.

6. The communication control method according to claim 5, further comprising
prior to the step B, a step of transmitting, from the user terminal to the cellular network, notification information indicating that the user terminal is storing the access point location information.

7. The communication control method according to claim 5, wherein
in the step B, the user terminal transmits the access point location information to the cellular base station, and
in the step C, the cellular base station acquires the access point location information transmitted from the user terminal.

8. The communication control method according to claim 5, wherein
in the step B, the user terminal transmits the access point location information to a server apparatus included in the cellular network, and
in the step C, the cellular base station acquires the access point location information from the server apparatus.

9. The communication control method according to claim 1, wherein
in the step A, the user terminal in the connected state of the cellular communication acquires the access point location information, on the basis of the MDT-associated information,
in the step B, the user terminal transmits, to the cellular network, the access point location information without retaining the access point location information.

10. The communication control method according to claim 9, wherein
the MDT-associated information includes trigger information for triggering an acquisition of the access point location information and/or triggering a transmission of the access point location information.

11. The communication control method according to claim 1, wherein
in the step A, the user terminal that supports an ANDSF acquires ANDSF information including the access point location information, from an ANDSF server,
in the step B, the user terminal transmits the access point location information included in the ANDSF information, to the cellular base station, in response to a request from the cellular base station, and
in the step C, the cellular base station acquires the access point location information transmitted from the user terminal.

12. The communication control method according to claim 11, further comprising
prior to the step B, a step of transmitting, from the user terminal to the cellular base station, information indicating whether the ANDSF is supported or information indicating whether to have the ANDSF information including the access point location information.

13. The communication control method according to claim 11, further comprising
a step of transmitting the request from the cellular base station to the user terminal, wherein
the request from the cellular base station includes an identifier indicating a WLAN access point arranged within a coverage area of the cellular base station.

14. The communication control method according to claim 1, wherein the step A comprises steps of:
acquiring, by the user terminal, the access point location information corresponding to a WLAN access point for which the user terminal has an access right; and
managing a list including the access point location information, wherein
in the step B, the user terminal transmits the access point location information included in the list, to the cellular network, in response to a request from the cellular base station.

15. The communication control method according to claim 14, wherein
in the step B, the user terminal transmits the access point location information to the cellular base station, and
in the step C, the cellular base station acquires the access point location information transmitted from the user terminal.

16. The communication control method according to claim 14, wherein
in the step B, the user terminal transmits the access point location information to a server apparatus included in the cellular network, and
in the step C, the cellular base station acquires the access point location information from the server apparatus.

17. A user terminal that supports a cellular communication and a WLAN communication, comprising
a controller configured to
receive, from a cellular base station included in a cellular network, Minimization of Drive Tests (MDT)-associated information including information for requesting a measurement of the WLAN access point;
acquire, on the basis of the MDT-associated information, access point location information on a geographical location of a WLAN access point,
receive, a first request message from the base station, the first request message requesting transmission of a measurement result of the measurement of the WLAN access point, and transmit, in response to the first request message, the access point location information to the cellular base station, wherein the MDT-associated information includes an identifier indicating a WLAN access point arranged within a coverage area of the cellular base station, as a WLAN access point to be measured.

\* \* \* \* \*